(12) United States Patent
Patney et al.

(10) Patent No.: US 11,644,685 B2
(45) Date of Patent: May 9, 2023

(54) PROCESSING STEREO IMAGES WITH A MACHINE-LEARNING MODEL

(71) Applicant: Meta Platforms Technologies, LLC, Menlo Park, CA (US)

(72) Inventors: Anjul Patney, Kirkland, WA (US); Anton S. Kaplanyan, Redmond, WA (US); Todd Goodall, Mill Valley, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 391 days.

(21) Appl. No.: 16/993,788

(22) Filed: Aug. 14, 2020

(65) Prior Publication Data

US 2022/0050304 A1    Feb. 17, 2022

(51) Int. Cl.
*G02B 30/52* (2020.01)
*H04N 13/282* (2018.01)
*G06T 5/00* (2006.01)
*G06T 5/50* (2006.01)
*G06N 20/00* (2019.01)
*G06T 7/593* (2017.01)
*H04N 19/00* (2014.01)
*G06T 3/40* (2006.01)

(52) U.S. Cl.
CPC .............. *G02B 30/52* (2020.01); *G06N 20/00* (2019.01); *G06T 3/4053* (2013.01); *G06T 5/002* (2013.01); *G06T 5/50* (2013.01); *G06T 7/593* (2017.01); *H04N 13/282* (2018.05); *G06T 2207/10012* (2013.01)

(58) Field of Classification Search
None
See application file for complete search history.

(56) References Cited

U.S. PATENT DOCUMENTS

| 2014/0009462 | A1* | 1/2014 | McNamer | H04N 13/239 345/419 |
| 2017/0205886 | A1* | 7/2017 | Wan | G06F 3/011 |
| 2019/0333237 | A1* | 10/2019 | Javidnia | G06T 3/4007 |

(Continued)

FOREIGN PATENT DOCUMENTS

WO    WO-2016097732 A1 *  6/2016  .......... G06F 3/0482

OTHER PUBLICATIONS

Jeon, Daniel S., et al. "Enhancing the spatial resolution of stereo images using a parallax prior." Proceedings of the IEEE conference on computer vision and pattern recognition. 2018. (Year: 2018).*

(Continued)

*Primary Examiner* — Emily C Terrell
*Assistant Examiner* — Nathan J Bloom
(74) *Attorney, Agent, or Firm* — Baker Botts L.L.P.

(57) ABSTRACT

In one embodiment, a method includes accessing a pair of stereo images for a scene, where each image of the pair of stereo images has incomplete pixel information and k channels, stacking the pair of stereo images to form a stacked input image with 2k channels, processing the stacked input image using a machine-learning model to generate a stacked output image with 2k channels, and separating the stacked output image with 2k channels into a pair of reconstructed stereo images for the scene, where each image of the pair of reconstructed stereo images has complete pixel information and k channels.

18 Claims, 8 Drawing Sheets

(56) References Cited

U.S. PATENT DOCUMENTS

2021/0241422 A1* 8/2021 Burke, III ............. G06T 3/0093
2022/0277421 A1* 9/2022 Xiao .................... G06T 3/4053

OTHER PUBLICATIONS

Zhou, et al., Stereo Magnification: Learning View Synthesis using Multiplane Images, ACM Trans. Graph., vol. 37, No. 4, Article 65, 12 pages.

* cited by examiner

PROCESSING STEREO IMAGES WITH A MACHINE-LEARNING MODEL

TECHNICAL FIELD

This disclosure generally relates to image processing, and in particular relates to processing stereo images with a machine-learning model.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device may process a single stacked image generated from a pair of stereo images instead of processing each of the pair separately. A processing cost, e.g., required computing and memory resources, may be significantly reduced especially when the computing device processes the stereo images with an image processing machine-learning model. The computing device may access a first pair of stereo images for a scene. Each of the first pair of stereo images may correspond to a scene viewed from a corresponding eye of a user. The first pair of stereo images may be used to provide a stereoscopic view of the scene to the user. An object captured in one of the first pair of stereo images may be shifted from the other image, where a degree of the shift may be associated with a distance of the object from a viewpoint of the user. Each image of the pair of stereo images may have k channels. A channel may represent a corresponding color information in the image. In particular embodiments, the k channels may comprise RGB channels. In particular embodiments, the k channels may comprise RGB channels and an alpha channel, where the alpha channel may indicate a transparency level of each pixel. In particular embodiments, the first pair of stereo images may be associated with a frame in a video stream. The computing device may stack the first pair of stereo images to form a stacked input image with 2k channels. In particular embodiments, to stack the first pair of stereo images to form the stacked input image with 2k channels, the computing device may stack the channels of both images by aligning pixel coordinates between the first pair of stereo images. In particular embodiments, to stack the first pair of stereo images to form the stacked input image with 2k channels, the computing device may calculate an importance score associated with each area among a plurality of areas in the scene. The computing device may identify an area with a highest importance score among the plurality of areas in the scene. The computing device may stack the channels of both images by aligning the identified area between the pair of stereo images. In particular embodiments, the importance score associated with each area may be based on a relative distance of the area from a vergence location of the user. The computing device may calculate the importance score associated with each area in the scene based on a relative distance of the area from the vergence location of the user. For example, a first area may be closer to the vergence location of the user than a second area. The computing device may assign a higher importance score to the first area and assign a lower importance score to the second area. In particular embodiments, the importance score associated with each area may be based on content associated each area. For example, a first area may be associated with an important content while a second area is not associated with any important content. The computing device may assign a higher importance score to the first area and assign a lower importance score to the second area. The computing device may process the stacked input image using a machine-learning model to generate a stacked output image with 2k channels. The computing device may separate the stacked output image with 2k channels into a second pair of stereo images for the scene. Each of the second pair of stereo images may have k channels. In particular embodiments, the machine-learning model may be an image reconstruction model that reconstructs restores sampled, noisy or damaged images. Each image of the first pair of stereo images may have incomplete pixel information. The second pair of stereo images may be a pair of reconstructed stereo images that may have complete pixel information. The machine-learning model may be trained with a loss function that measures differences between each image of the second pair of stereo images and a corresponding image of a pair of ground truth stereo images.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or

DESCRIPTION OF EXAMPLE EMBODIMENTS

Figure 1:
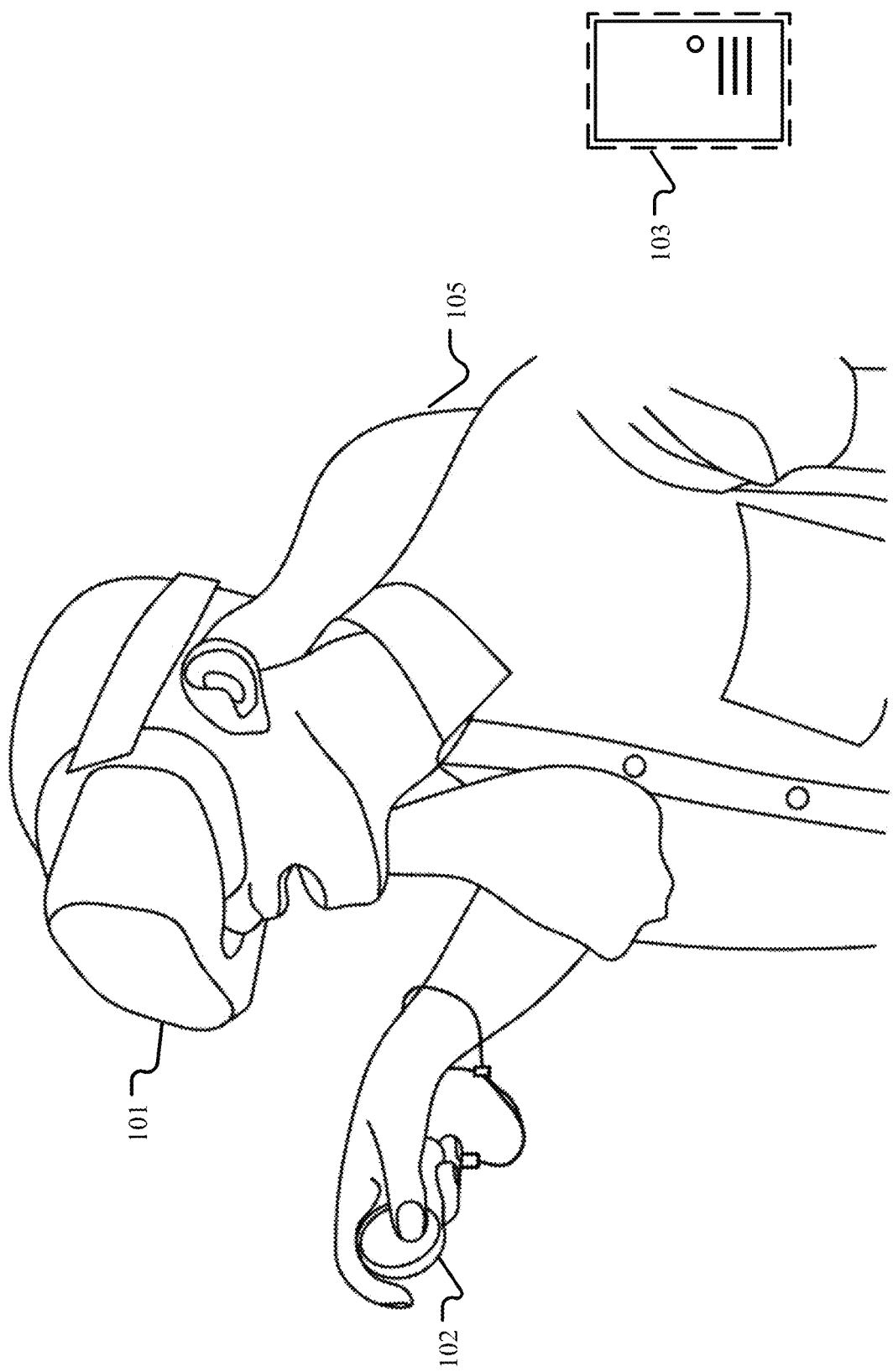
FIG. 1 illustrates an example artificial reality system.

FIG. 1 illustrates an example artificial reality system. Artificial reality is a form of reality that has been adjusted in some manner before presentation to a user 105, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The example artificial reality system illustrated in FIG. 1 may comprise a head-mounted display (HMD) 101, a controller 102, and a computing device 103. A user 105 may wear a head-mounted display (HMD) 101 that may provide visual artificial reality content to the user 105. The HMD 101 may include an audio device that may provide audio artificial reality content to the user 105. A controller 102 may comprise a trackpad and one or more buttons. The controller 102 may receive input from the user 105 and relay the input to the computing device 103. The controller 102 may also provide haptic feedback to the user 105. The computing device 103 may be connected to the HMD 101 and the controller 102. The computing device 103 may control the HMD 101 and the controller 102 to provide the artificial reality content to the user and receive input from the user 105. The computing device 103 may be a standalone host computer system, combined with the HMD 101, a mobile device, or any other hardware platform capable of providing artificial reality content to one or more users 105 and receive input from the users 105.

In particular embodiments, the computing device 103 may present a stereoscopic video to the user 105 through the HMD 101. Rendering and/or transmitting high-resolution and high-frame-rate videos may be a costly process. To ameliorate that cost, the computing device 103 may render/ transmit only a small subset of the pixels in the stereoscopic video according to the visual acuity of humans and generate/ reconstruct the complete video using a machine-learning model. A pair of stereo images per frame may need to be rendered for the stereoscopic video. The cost for processing each image of the pair separately by the machine-learning model may be reduced if the computing device 103 may be able to process the pair of images simultaneously by the machine-learning model. Furthermore, the stereoscopic video may need to be processed by any other suitable machine-learning model, where processing the pair of images for a frame simultaneously could reduce the processing costs. be a costly process. The examples of such machine-learning model may include image-compression/ decompression machine-learning model, super-resolution machine-learning model, and image-classifying machine-learning model.

In particular embodiments, a computing device 103 may process a single stacked image generated from a pair of stereo images instead of processing each of the pair separately. A processing cost, e.g., required computing and memory resources, may be significantly reduced especially when the computing device 103 processes the stereo images with an image processing machine-learning model. The computing device 103 may access a first pair of stereo images for a scene. Each of the first pair of stereo images may correspond to a scene viewed from a corresponding eye of a user. The first pair of stereo images may be used to provide a stereoscopic view of the scene to the user. An object captured in one of the first pair of stereo images may be shifted from the other image, where a degree of the shift may be associated with a distance of the object from a viewpoint of the user. Each image of the pair of stereo images may have k channels. A channel may represent a corresponding color information in the image. In particular embodiments, the k channels may comprise RGB channels. In particular embodiments, the k channels may comprise RGB channels and an alpha channel, where the alpha channel may indicate a transparency level of each pixel. In particular embodiments, the first pair of stereo images may be associated with a frame in a video stream. The computing device 103 may stack the first pair of stereo images to form a stacked input image with 2k channels. In particular embodiments, to stack the first pair of stereo images to form the stacked input image with 2k channels, the computing device 103 may stack the channels of both images by aligning pixel coordinates between the first pair of stereo images. In particular embodiments, to stack the first pair of stereo images to form the stacked input image with 2k channels, the computing device 103 may calculate an importance score associated with each area among a plurality of areas in the scene. The computing device 103 may identify an area with a highest importance score among the plurality of areas in the scene. The computing device 103 may stack the channels of both images by aligning the identified area between the pair of stereo images. In particular embodiments, the importance score associated with each area may be based on a relative distance of the area from a vergence location of the user. The computing device 103 may calculate the importance score associated with each area in the scene based on a relative distance of the area from the vergence location of the user. For example, a first area may be closer to the vergence location of the user than a second area. The computing device 103 may assign a higher importance score to the first area and assign a lower importance score to the second area. In particular embodiments, the importance score associated with each area may be based on content associated each area. For example, a first area may be associated with an important content while a second area is not associated with any important content. The computing device 103 may assign a higher importance score to the first area and assign a lower importance score to the second area. The computing device 103 may process the stacked input image using a machine-learning model to generate a stacked output image with 2k channels. The computing device 103 may separate the stacked output image with 2k channels into a second pair of stereo images for the scene. Each of the second pair of stereo images may have k channels. In particular embodiments, the machine-learning model may be an image reconstruction model that reconstructs restores sampled, noisy or damaged images. Each image of the first pair of stereo images may have incomplete pixel information. The second pair of stereo images may be a pair of reconstructed stereo images that may have complete pixel information. The machine-learning model may be trained with a loss function that measures differences between each image of the second pair of stereo images and a corresponding image of a pair of ground truth stereo images. Although this disclosure describes processing a single stacked image generated from a pair of stereo images instead of processing each of the pair separately in a particular manner, this disclosure contemplates processing a single stacked image generated from a pair of stereo images instead of processing each of the pair separately in any suitable manner.

Figure 2:
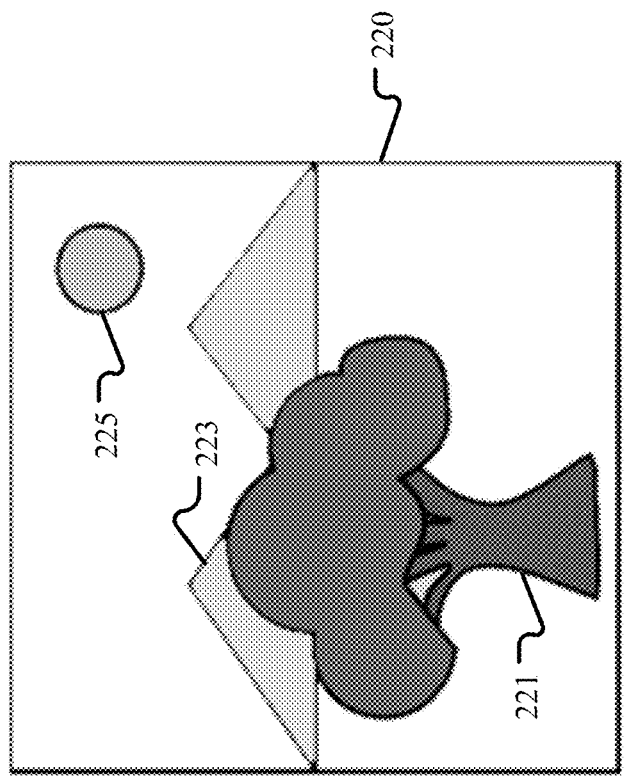
FIG. 2 illustrates an example pair of stereo images.
Figure 2:
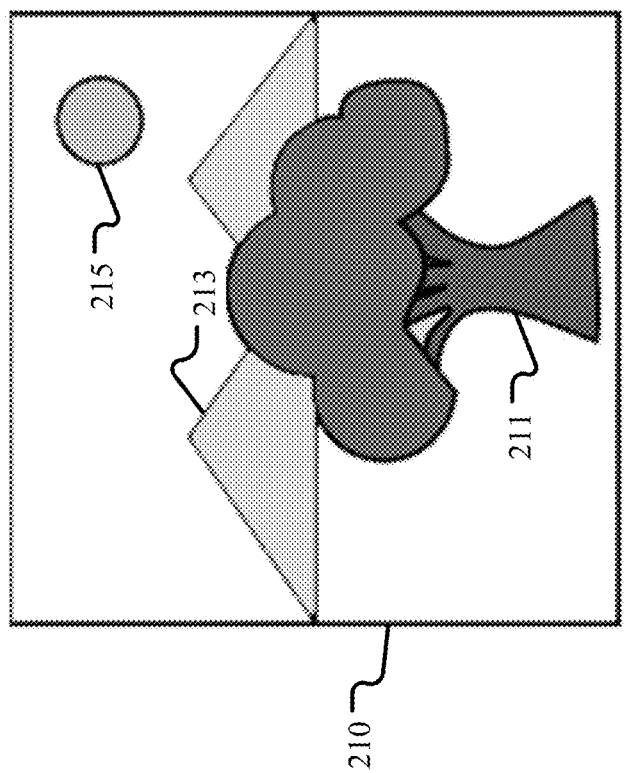

In particular embodiments, a computing device 103 may access a first pair of stereo images for a scene. Each of the first pair of stereo images may correspond to a scene viewed from a corresponding eye of a user. The first pair of stereo images may be used to provide a stereoscopic view of the scene to the user. An object captured in one of the first pair of stereo images may be shifted from the other image, where a degree of the shift may be associated with a distance of the object from a viewpoint of the user. Each image of the pair of stereo images may have k channels. A channel may represent a corresponding color information in the image. In particular embodiments, the k channels may comprise RGB channels. In particular embodiments, the k channels may comprise RGB channels and an alpha channel, where the alpha channel may indicate a transparency level of each pixel. FIG. 2 illustrates an example pair of stereo images. As an example and not by way of limitation, the computing device 103 may access a pair of stereo images 210 and 220. The image 210 corresponds to a scene viewed by the left eye of the user. The image 220 corresponds to the scene viewed by the right eye of the user. The computing device 103 may present both images 210 and 220 simultaneously to the user 105 to provide a stereoscopic view of the scene. The image 210 corresponding to the left eye may comprise a tree 211, mountains 213 and the Sun 215. The image 220 corresponding to the right eye may comprise a tree 221, mountains 223 and the Sun 225. The objects 221, 223, and 225 captured in the image 220 may be shifted from the image 210. A degree of the shift of an object may depend on a distance of the object from the viewpoint of the user. For example, the tree 223 in the image 220 is closer to the user than the other objects 223 or 225. Thus, the tree 223 is shifted greater in the image 220 from the image 210 than the mountains 223 or the Sun 225. In particular embodiments, each image 210 and 220 comprise RGB channels, where each of the RGB channels represents a corresponding color information. In particular embodiments, the images 210 and 220 may comprise RGB+alpha channels, where each of the RGB channels represents a corresponding color information and the alpha channel represents a transparency level of the pixels.

In particular embodiments, the first pair of stereo images may be associated with a frame in a video stream. As an example and not by way of limitation, the computing device 103 may present a stereoscopic video to the user 105. The computing device 103 may render images corresponding to each frame of the video. The computing device 103 may access a pair of stereo images 210 and 220 for frame k of the video. Although this disclosure describes accessing a pair of stereo images corresponding to a frame in a video stream in a particular manner, this disclosure contemplates accessing a pair of stereo images corresponding to a frame in a video stream in any suitable manner.

Figure 3:
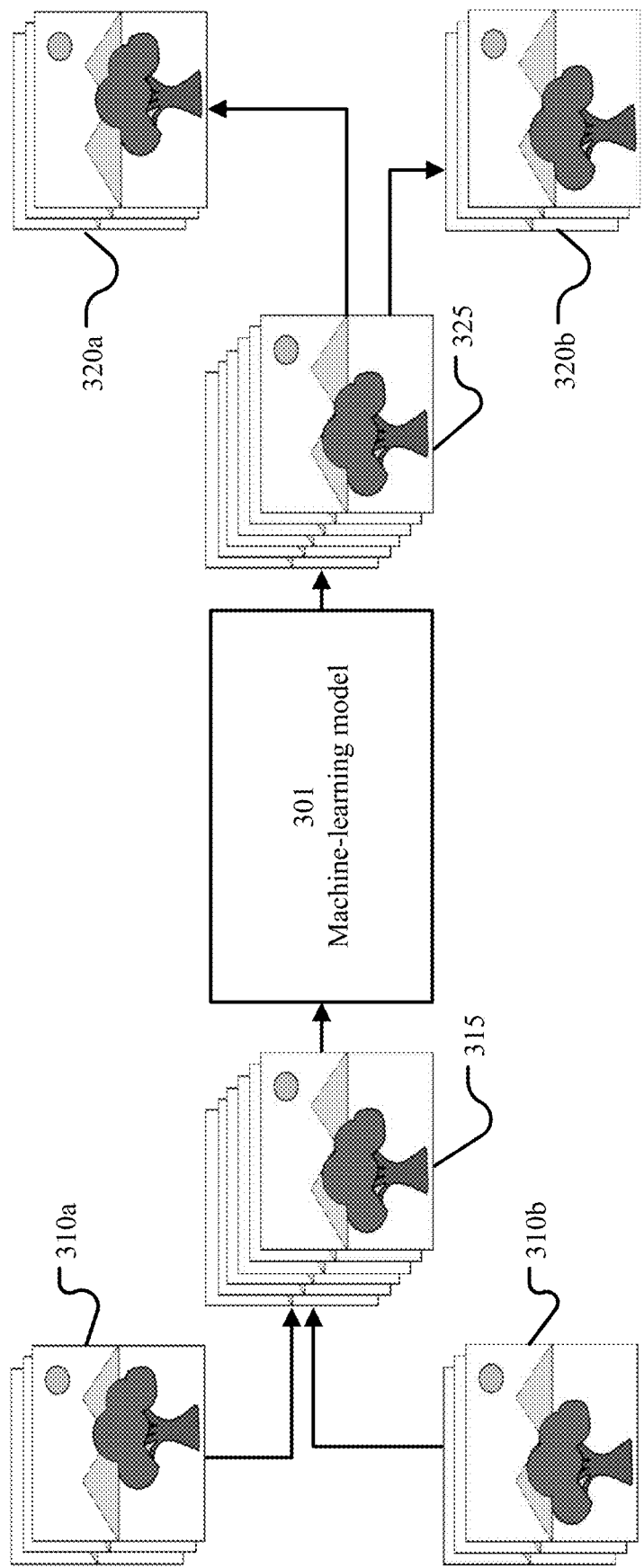
FIG. 3 illustrates an example process of a pair of stereo images with an image processing machine-learning model.

FIG. 3 illustrates an example process of a pair of stereo images with an image processing machine-learning model. In the example illustrated in FIG. 3, the computing device 103 accesses a first pair of stereo images 310a and 310b, where each of the pair images comprises k channels. The computing device 103 may process each of the stereo images 310a and 310b with an image processing machine-learning model 301 separately. However, a cost of processing the pair of stereo images 310a and 310b separately may be higher than a cost of processing the pair of stereo images 310a and 310b simultaneously. Being compared with a machine-learning model that processes the pair of stereo images separately, the machine-learning model 301 that processes the pair of stereo images simultaneously should be capable of handling 2k channel input instead of k input channels and should be capable of generating 2k channel output instead of k output channels. However, the size of the internal neural networks may be similar to that of the internal neural networks of the machine-learning model that processes the pair of stereo images separately. Therefore, the cost of processing the pair of stereo images 310a and 310b with a machine-learning model simultaneously would be considerably less than the cost of processing the pair of stereo images 310a and 310b with a machine-learning model separately. The computing device 103 stacks the first pair of stereo images 310a and 310b to form a stacked input image 315 that comprises 2k channels. The computing device 103 processes the stacked input image 315 with the image processing machine-learning model 301. The machine-learning model 301 generates a stacked output image 325 that comprises 2k channels. The computing device 103 separates the stacked output image 325 into a second pair of stereo images 320a and 320b. Although this disclosure describes processing of a pair of stereo images with an image processing machine-learning model in a particular manner, this disclosure contemplates processing of a pair of stereo images with an image processing machine-learning model in any suitable manner.

In particular embodiments, the computing device 103 may stack the first pair of stereo images to form a stacked input image with 2k channels. As an example and not by way of limitation, the computing device 103 may present a stereoscopic video to the user. The stereo images of the video may not comprise complete pixel information. To present the stereo images to the user 105, the computing device 103 may need to process the input pair of stereo images 310a and 310b by an image reconstruction machine-learning model 301. In order to process the input pair of stereo images 310a and 310b simultaneously by the image reconstruction machine-learning model 301, the computing device 103 may stack the input pair of stereo images 310a and 310b to form a stacked input image 315. Each of the stereo images 310a and 310b may have three channels, i.e., RGB channels. The stacked input image 315 may have six channels: RGB channels from each of the stereo images 310a and 310b. The computing device 103 may stack the input pair of stereo images 310a and 310b in one of any suitable ways. A number of suitable ways will be addressed below. Although this disclosure describes stacking a pair of stereo images to form a stacked input image in a particular manner, this disclosure contemplates stacking a pair of stereo images to form a stacked input image in any suitable manner.

In particular embodiments, the computing device 103 may stack the channels of both images by aligning pixel coordinates between the first pair of stereo images. As an example and not by way of limitation, continuing with a prior example, the computing device 103 may align pixel (x, y) of image 310a to pixel (x, y) of image 310b and stack the channels of images 310a and 310b to form the stacked input image 315. Although this disclosure describes stacking the channels of the pair of stereo images by aligning pixel coordinates between the pair of stereo images in a particular manner, this disclosure contemplates stacking the channels of the pair of stereo images by aligning pixel coordinates between the pair of stereo images in any suitable manner.

In particular embodiments, the computing device 103 may calculate an importance score associated with each area among a plurality of areas in the scene to stack the first pair of stereo images to form the stacked input image with 2k channels. The computing device 103 may identify an area with a highest importance score among the plurality of areas in the scene. The computing device 103 may stack the channels of both images by aligning the identified area between the pair of stereo images. Any suitable method for calculating the importance score associated with each area among the plurality of areas in the scene may be utilized. A number of methods will be addressed below. Although this disclosure describes stacking the channels of a pair of stereo images by aligning an identified area between the pair of stereo images based on importance scores associated with the plurality of areas in a particular manner, this disclosure contemplates stacking the channels of a pair of stereo images by aligning an identified area between the pair of stereo images based on importance scores associated with the plurality of areas in any suitable manner.

In particular embodiments, the importance score associated with each area may be based on a relative distance of the area from a vergence location of the user. The computing device 103 may calculate the importance score associated with each area in the scene based on a relative distance of the area from the vergence location of the user. For example, a first area may be closer to the vergence location of the user than a second area. The computing device 103 may assign a higher importance score to the first area and assign a lower importance score to the second area. The computing device 103 may identify an area with a highest importance score among the plurality of areas in the scene. The computing device 103 may stack the channels of both images by aligning the identified area between the pair of stereo images to form the stacked input image. As an example and not by way of limitation, continuing with a prior example, the user 105 may look at a point in the scene of the presented video. The focal point the user is looking at may be referred to as a vergence location of the user 105. The user 105 may look at the middle of the tree in the scene, i.e., 211 in the image 210 and 221 in the image 220. The computing device may assign a high importance score to an area covering the middle of the tree while assigning a lower importance score to an area covering the mountains. The computing device 103 may stack the channels of the pair of stereo images 310a and 310b by aligning the area with the highest importance score to form the stacked input image 315. Although this disclosure describes stacking the channels of the pair of stereo images by aligning an area with a highest importance score determined based on a distance of the area from the vergence location of the user in a particular manner, this disclosure contemplates stacking the channels of the pair of stereo images by aligning an area with a highest importance score determined based on a distance of the area from the vergence location of the user in any suitable manner.

In particular embodiments, the importance score associated with each area may be based on content associated each area. For example, a first area may be associated with an important content while a second area is not associated with any important content. The computing device 103 may assign a higher importance score to the first area and assign a lower importance score to the second area. The computing device 103 may identify an area with a highest importance score among the plurality of areas in the scene. The computing device 103 may stack the channels of both images by aligning the identified area between the pair of stereo images to form the stacked input image. As an example and not by way of limitation, continuing with a prior example, the computing device 103 may determine an importance score associated with an area based on content associated with the area. The computing device 103 may assign a high importance score to an area covering the tree 211 in image 210 and 221 in image 220. The computing device 103 may assign a high importance score to an area covering the mountains 213 in image 210 and 223 in image 220. The computing device 103 may assign a high importance score to an area covering the Sun 215 in image 210 and 225 in image 220. The computing device 103 may assign a low importance score to an area covering space without any meaningful objects. In particular embodiments, the computing device 103 may determine a level of importance associated with each of one or more objects based on context of the video. If the tree 211 in image 210 and 221 in image 220 has been treated importantly in the previous frames of the video, the tree 211 in image 210 and 221 in image 220 may be associated with a high importance score. The computing device 103 may stack the channels of the pair of stereo images 310a and 310b by aligning the area with the highest importance score to form the stacked input image 315. Although this disclosure describes stacking the channels of the pair of stereo images by aligning an area with a highest importance score determined based on an object associated with the area in a particular manner, this disclosure contemplates stacking the channels of the pair of stereo images by aligning an area with a highest importance score determined based on an object associated with the area in any suitable manner.

In particular embodiments, the computing device 103 may process the stacked input image using a machine-learning model to generate a stacked output image with 2k channels. As an example and not by way of limitation, continuing with a prior example, the computing device 103 may provide the stacked input image 315 to the image processing machine-learning model 301 as input. The machine-learning model 301 may generate the stacked output image 325. The stacked output image 325 may have six channels, i.e., two times of RGB channels. Although this disclosure describes generating a stacked output image by processing a stacked input image with a machine-learning model in a particular manner, this disclosure contemplates generating a stacked output image by processing a stacked input image with a machine-learning model in any suitable manner.

In particular embodiments, the computing device 103 may separate the stacked output image with 2k channels into a second pair of stereo images for the scene. Each of the second pair of stereo images may have k channels. As an example and not by way of limitation, continuing with a prior example, the computing device 103 may separate the stacked output image 325 into a reconstructed pair of stereo images for the scene 320a and 320b. Each of the reconstructed pair of stereo images for the scene, 320a or 320b, may have RGB channels. Also, each of the reconstructed pair of stereo images for the scene, 320a or 320b, may have restored pixel information Although this disclosure describes separating a stacked output image into a pair of stereo images in a particular manner, this disclosure contemplates separating a stacked output image into a pair of stereo images in any suitable manner.

In particular embodiments, the machine-learning model may be trained with a loss function that measures differences between each image of the second pair of stereo images and a corresponding image of a pair of ground truth stereo images. As an example and not by way of limitation, continuing with a prior example, a computing device may compute a loss based on measured differences between each images of the reconstructed pair of stereo images 320a and 320b and their corresponding ground truth images. The computing device may compute gradients of trainable variables of the machine-learning model 301 based on the computed loss. The computing device may update the trainable variables by a gradient-descent backpropagation procedure. Although this disclosure describes training a machine-learning model based on differences between a pair of output stereo images and their corresponding ground truth images in a particular manner, this disclosure contemplates training a machine-learning model based on differences between a pair of output stereo images and their corresponding ground truth images in any suitable manner.

Figure 4A:
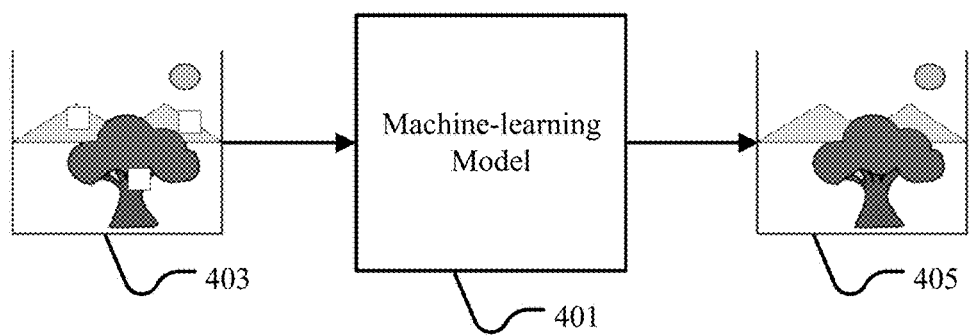
FIG. 4A illustrates an example image reconstruction using a machine-learning model.

In particular embodiments, the machine-learning model may be an image reconstruction model that reconstructs restores sampled, noisy or damaged images. Each image of the first pair of stereo images may have incomplete pixel information. The second pair of stereo images may be a pair of reconstructed stereo images that may have complete pixel information. FIG. 4A illustrates an example image reconstruction using a machine-learning model. As an example and not by way of limitation, illustrated in FIG. 4A, the computing device 103 may stack a first pair of stereo images to form a stacked input image 403. Each of the first pair of stereo images may have RGB channels. The stacked input image 403 may have six channels: two times of RGB channels. Each channel in the stacked input image 403 may have incomplete pixel information. In particular embodiments, the computing device 103 may stack the first pair of stereo images by aligning pixel coordinates between the pair of stereo images. In particular embodiments, the computing device 103 may stack the first pair of stereo images by aligning an area with a highest importance score determined based on a distance of the area from the vergence location of the user 105. In particular embodiments, the computing device 103 may stack the first pair of stereo images by aligning an area with a highest importance score determined based on content associated with the area. The computing device 103 may process the stacked input image 403 using an image reconstruction machine-learning model 401 to generate a stacked output image 405. The stacked output image 405 may comprise six channels. The computing device 103 may separate the stacked output image 405 into a second pair of stereo images that have complete pixel information. In particular embodiments, the second pair of stereo images may have restored pixel information. The computing device 103 may present the second pair of stereo images to the user 105. Although this disclosure describes reconstructing a pair of stereo images using a machine-learning model in a particular manner, this disclosure contemplates reconstructing a pair of stereo images using a machine-learning model in any suitable manner.

Figure 4B:
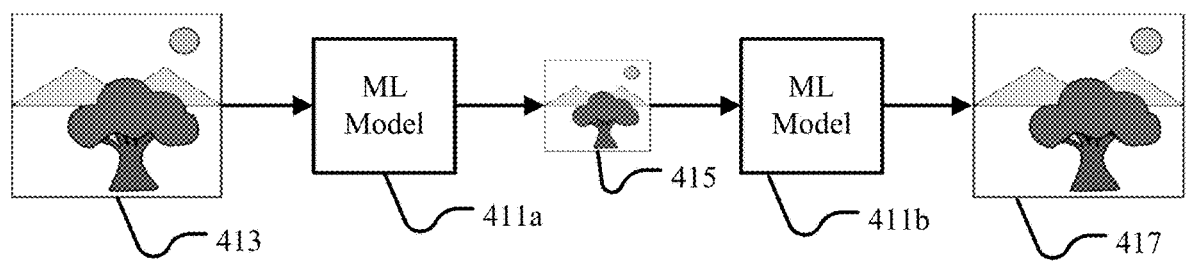
FIG. 4B illustrates example image compression and decompression using a machine-learning model.

In particular embodiments, the machine-learning model may be an image compression model that reduces resolutions of the images and restores the resolutions before displaying images. The stacked output image with 2k channels may be a stacked uncompressed image with 2k channels. After being separated by the computing device 103, the second pair of stereo images may be a pair of uncompressed stereo images. FIG. 4B illustrates example image compression and decompression using a machine-learning model. As an example and not by way of limitation, illustrated in FIG. 4B, a first pair of stereo images may need to be compressed in order to save the required storage memory space and/or transmission costs. A computing device may stack the first pair of stereo images to form a stacked input image 413. Each of the first pair of stereo images may have RGB channels. The stacked input image 413 may have six channels: two times of RGB channels. In particular embodiments, the computing device may stack the first pair of stereo images by aligning pixel coordinates between the pair of stereo images. In particular embodiments, the computing device may stack the pair of stereo images by aligning an area with a highest importance score determined based on content associated with the area. The computing device may process the stacked input image 413 using an image compression machine-learning model 411a to generate a stacked compressed image 415. The stacked compressed image 415 may comprise six channels. In order to present the pair of stereo images to a user, the computing device may need to decompress the stacked compressed image 415. The computing device may process the stacked compressed image 415 using an image decompression machine-learning model 411b to generate a stacked output image 417. The stacked output image 415 may comprise six channels. The computing device may separate the stacked output image 417 into a second pair of stereo images. The computing device may present the second pair of stereo images to the user. Although this disclosure describes compressing and decompressing a pair of stereo images using machine-learning models in a particular manner, this disclosure contemplates compressing and decompressing a pair of stereo images using machine-learning models in any suitable manner.

Figure 4C:
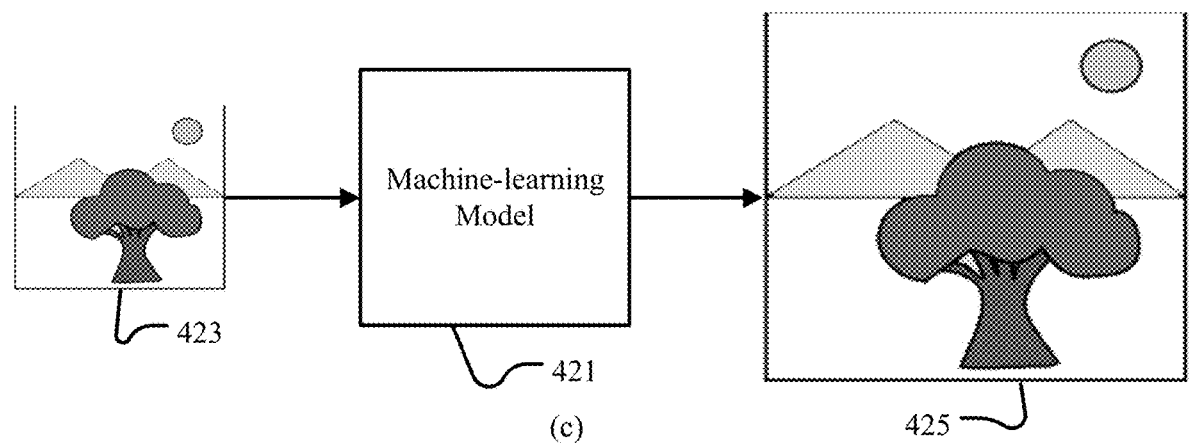
FIG. 4C illustrates an example image resolution enhancement using a machine-learning model.

In particular embodiments, the machine-learning model may be a super resolution model that improves details of image by enhancing resolutions of the images. The stacked output image with 2k channels may be a stacked resolution-enhanced image with 2k channels. The second pair of stereo images may be a pair of resolution-enhanced images. FIG. 4C illustrates an example image resolution enhancement using a machine-learning model. As an example and not by way of limitation, illustrated in FIG. 4C, the computing device 103 may access a first pair of stereo images, where the resolutions for the first pair of stereo images may not be high enough to provide a satisfying user experience. The computing device 103 may stack the first pair of stereo images to form a stacked input image 423. Each of the first pair of stereo images may have RGB channels. The stacked input image 423 may have six channels: two times of RGB channels. Each channel in the stacked input image 423 may have incomplete pixel information. In particular embodiments, the computing device 103 may stack the first pair of stereo images by aligning pixel coordinates between the pair of stereo images. In particular embodiments, the computing device 103 may stack the first pair of stereo images by aligning an area with a highest importance score determined based on a distance of the area from the vergence location of the user 105. In particular embodiments, the computing device 103 may stack the first pair of stereo images by aligning an area with a highest importance score determined based on content associated with the area. The computing device 103 may process the stacked input image 423 using an image resolution enhancement machine-learning model 421 to generate a stacked output image 425. The stacked output image 425 may comprise six channels. The computing device 103 may separate the stacked output image 425 into a second pair of stereo images that have higher resolutions than the first pair of stereo images. The computing device 103 may present the second pair of stereo images to the user 105. Although this disclosure describes enhancing resolutions of a pair of stereo images using a machine-learning model in a particular manner, this disclosure contemplates enhancing resolutions of a pair of stereo images using a machine-learning model in any suitable manner.

Figure 4D:
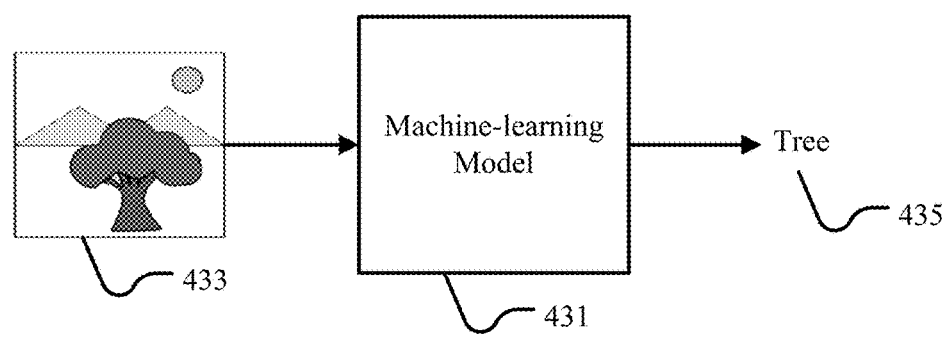
FIG. 4D illustrates an example image classification using a machine-learning model.

In particular embodiments, the machine-learning model may be an image classification model that classifies objects in images. FIG. 4D illustrates an example image classification using a machine-learning model. As an example and not by way of limitation, illustrated in FIG. 4D, the computing device 103 may access a first pair of stereo images for a scene the user 105 is watching through the HMD 101. The first pair of stereo images may be captured by cameras associated with the HMD 101. The computing device 103 may classify the object in the first pair of stereo images and present the classification to the user 105 in real-time. The computing device 103 may stack the first pair of stereo images to form a stacked input image 433. Each of the first pair of stereo images may have RGB channels. The stacked input image 433 may have six channels: two times of RGB channels. In particular embodiments, the computing device 103 may stack the first pair of stereo images by aligning pixel coordinates between the pair of stereo images. In particular embodiments, the computing device 103 may stack the first pair of stereo images by aligning an area with a highest importance score determined based on a distance of the area from the vergence location of the user 105. In particular embodiments, the computing device 103 may stack the first pair of stereo images by aligning an area with a highest importance score determined based on content associated with the area. The computing device 103 may process the stacked input image 433 using an image classification machine-learning model 431 to generate a classification 435 of an object in the scene. The computing device 103 may present the classification 435 to the user 105. Although this disclosure describes classifying an object in a pair of stereo images using a machine-learning model in a particular manner, this disclosure contemplates classifying an object in a pair of stereo images using a machine-learning model in any suitable manner.

Figure 5:
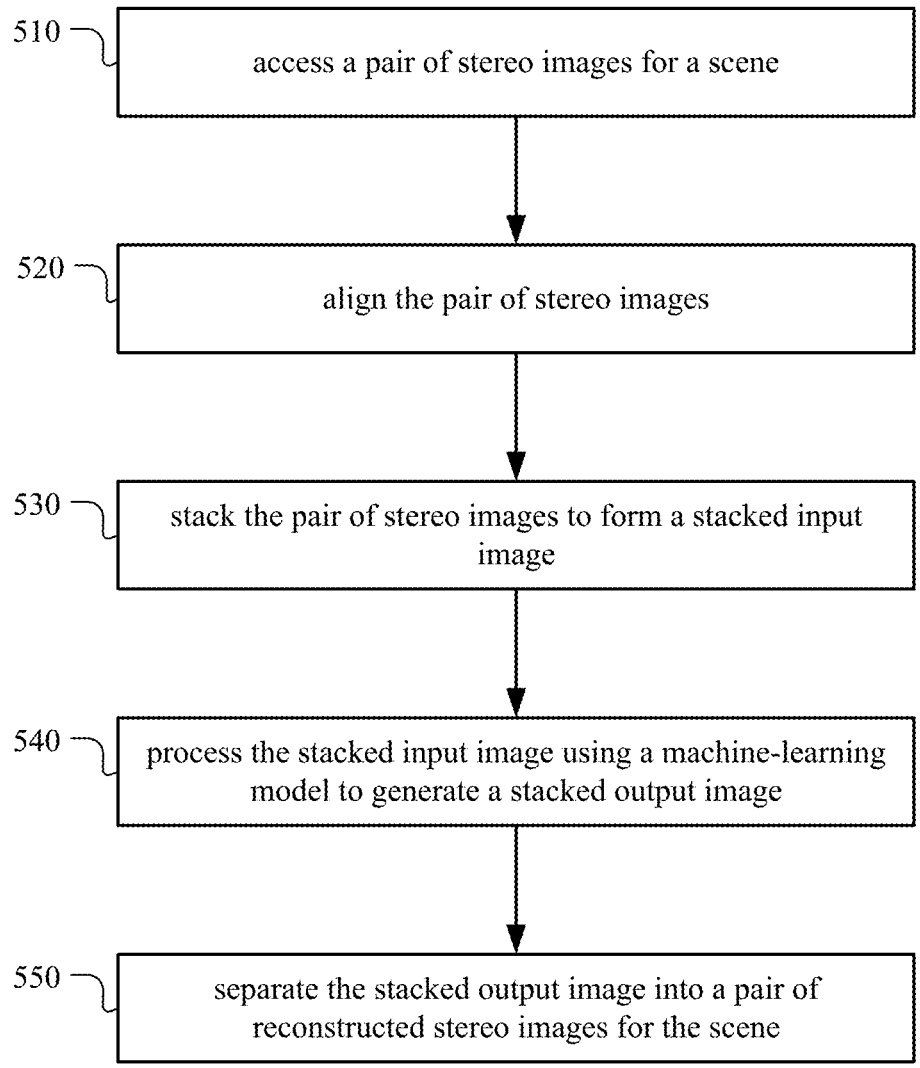
FIG. 5 illustrates an example method for processing a pair of stereo images using a machine-learning model.

FIG. 5 illustrates an example method 500 for processing a pair of stereo images using a machine-learning model. The method may begin at step 510, where the computing device may access a pair of stereo images for a scene. Each image of the pair of stereo images may have incomplete pixel information and k channels. At step 520, the computing device may align the pair of stereo images. At step 530, the computing device may stack the pair of stereo images to form a stacked input image with 2k channels. At step 540, the computing device may process the stacked input image using a machine-learning model to generate a stacked output image with 2k channels. At step 550, the computing device may separate the stacked output image with 2k channels into a pair of reconstructed stereo images for the scene. Each image of the pair of reconstructed stereo images may have complete pixel information and k channels. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for processing a pair of stereo images using a machine-learning model including the particular steps of the method of FIG. 5, this disclosure contemplates any suitable method for processing a pair of stereo images using a machine-learning model including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
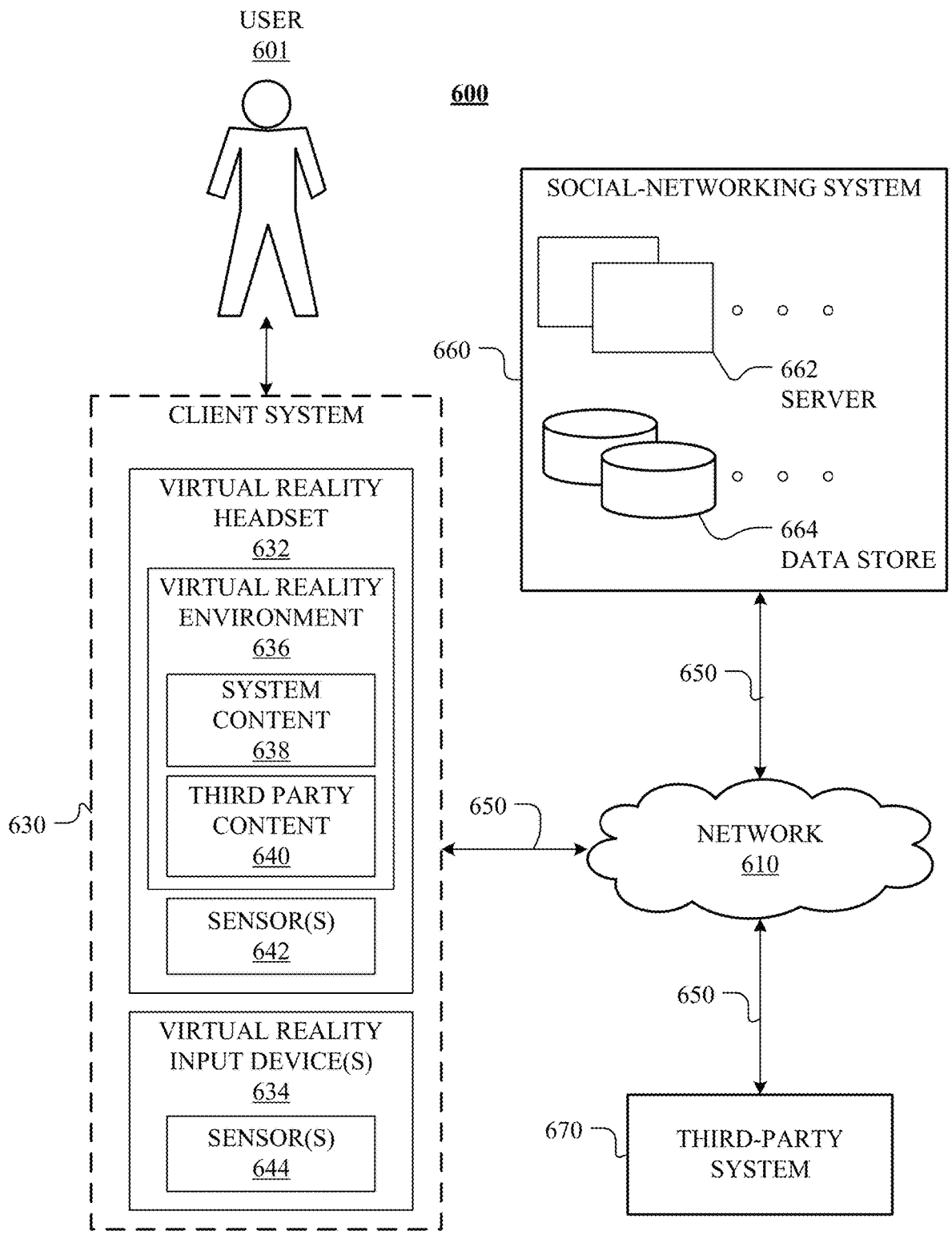
FIG. 6 illustrates an example network environment associated with a virtual reality system.

FIG. 6 illustrates an example network environment 600 associated with a virtual reality system. Network environment 600 includes a user 601 interacting with a client system 630, a social-networking system 660, and a third-party system 670 connected to each other by a network 610. Although FIG. 6 illustrates a particular arrangement of a user 601, a client system 630, a social-networking system 660, a third-party system 670, and a network 610, this disclosure contemplates any suitable arrangement of a user 601, a client system 630, a social-networking system 660, a third-party system 670, and a network 610. As an example and not by way of limitation, two or more of a user 601, a client system 630, a social-networking system 660, and a third-party system 670 may be connected to each other directly, bypassing a network 610. As another example, two or more of a client system 630, a social-networking system 660, and a third-party system 670 may be physically or logically co-located with each other in whole or in part. Moreover, although FIG. 6 illustrates a particular number of users 601, client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple users 601, client systems 630, social-networking systems 660, third-party systems 670, and networks 610.

This disclosure contemplates any suitable network 610. As an example and not by way of limitation, one or more portions of a network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 610 may include one or more networks 610.

Links 650 may connect a client system 630, a social-networking system 660, and a third-party system 670 to a communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout a network environment 600. One or more first links 650 may differ in one or more respects from one or more second links 650.

In particular embodiments, a client system 630 may be an electronic device including hardware, software, or embedded logic components or a combination of two or more such components and capable of carrying out the appropriate functionalities implemented or supported by a client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 630. A client system 630 may enable a network user at a client system 630 to access a network 610. A client system 630 may enable its user to communicate with other users at other client systems 630. A client system 630 may generate a virtual reality environment for a user to interact with content.

In particular embodiments, a client system 630 may include a virtual reality (or augmented reality) headset 632, such as OCULUS RIFT and the like, and virtual reality input device(s) 634, such as a virtual reality controller. A user at a client system 630 may wear the virtual reality headset 632 and use the virtual reality input device(s) to interact with a virtual reality environment 636 generated by the virtual reality headset 632. Although not shown, a client system 630 may also include a separate processing computer and/or any other component of a virtual reality system. A virtual reality headset 632 may generate a virtual reality environment 636, which may include system content 638 (including but not limited to the operating system), such as software or firmware updates and also include third-party content 640, such as content from applications or dynamically downloaded from the Internet (e.g., web page content). A virtual reality headset 632 may include sensor(s) 642, such as accelerometers, gyroscopes, magnetometers to generate sensor data that tracks the location of the headset device 632. The headset 632 may also include eye trackers for tracking the position of the user's eyes or their viewing directions. The client system may use data from the sensor(s) 642 to determine velocity, orientation, and gravitation forces with respect to the headset. Virtual reality input device(s) 634 may include sensor(s) 644, such as accelerometers, gyroscopes, magnetometers, and touch sensors to generate sensor data that tracks the location of the input device 634 and the positions of the user's fingers. The client system 630 may make use of outside-in tracking, in which a tracking camera (not shown) is placed external to the virtual reality headset 632 and within the line of sight of the virtual reality headset 632. In outside-in tracking, the tracking camera may track the location of the virtual reality headset 632 (e.g., by tracking one or more infrared LED markers on the virtual reality headset 632). Alternatively or additionally, the client system 630 may make use of inside-out tracking, in which a tracking camera (not shown) may be placed on or within the virtual reality headset 632 itself. In inside-out tracking, the tracking camera may capture images around it in the real world and may use the changing perspectives of the real world to determine its own position in space.

Third-party content 640 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 630 may enter a Uniform Resource Locator (URL) or other address directing a web browser to a particular server (such as server 662, or a server associated with a third-party system 670), and the web browser may generate a Hyper Text Transfer Protocol (HTTP) request and communicate the HTTP request to server. The server may accept the HTTP request and communicate to a client system 630 one or more Hyper Text Markup Language (HTML) files responsive to the HTTP request. The client system 630 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 660 may be a network-addressable computing system that can host an online social network. The social-networking system 660 may generate, store, receive, and send social-networking data, such as, for example, user-profile data, concept-profile data, social-graph information, or other suitable data related to the online social network. The social-networking system 660 may be accessed by the other components of network environment 600 either directly or via a network 610. As an example and not by way of limitation, a client system 630 may access the social-networking system 660 using a web browser of a third-party content 640, or a native application associated with the social-networking system 660 (e.g., a mobile social-networking application, a messaging application, another suitable application, or any combination thereof) either directly or via a network 610. In particular embodiments, the social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, the social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, the social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. The social-networking system 660 may provide users of the online social network the ability to communicate and interact with other users. In particular embodiments, users may join the online social network via the social-networking system 660 and then add connections (e.g., relationships) to a number of other users of the social-networking system 660 whom they want to be connected to. Herein, the term "friend" may refer to any other user of the social-networking system 660 with whom a user has formed a connection, association, or relationship via the social-networking system 660.

In particular embodiments, the social-networking system 660 may provide users with the ability to take actions on various types of items or objects, supported by the social-networking system 660. As an example and not by way of limitation, the items and objects may include groups or social networks to which users of the social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 660 or by an external system of a third-party system 670, which is separate from the social-networking system 660 and coupled to the social-networking system 660 via a network 610.

In particular embodiments, the social-networking system 660 may be capable of linking a variety of entities. As an example and not by way of limitation, the social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating the social-networking system 660. In particular embodiments, however, the social-networking system 660 and third-party systems 670 may operate in conjunction with each other to provide social-networking services to users of the social-networking system 660 or third-party systems 670. In this sense, the social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 660 also includes user-generated content objects, which may enhance a user's interactions with the social-networking system 660. User-generated content may include anything a user can add, upload, send, or "post" to the social-networking system 660. As an example and not by way of limitation, a user communicates posts to the social-networking system 660 from a client system 630. Posts may include data such as status updates or other textual data, location information, photos, videos, links, music or other similar data or media. Content may also be added to the social-networking system 660 by a third-party through a "communication channel," such as a newsfeed or stream.

In particular embodiments, the social-networking system 660 may include a variety of servers, sub-systems, programs, modules, logs, and data stores. In particular embodiments, the social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 660 may also include suitable components such as network interfaces, security mechanisms, load balancers, failover servers, management-and-network-operations consoles, other suitable components, or any suitable combination thereof. In particular embodiments, the social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 660 to one or more client systems 630 or one or more third-party systems 670 via a network 610. The web server may include a mail server or other messaging functionality for receiving and routing messages between the social-networking system 660 and one or more client systems 630. An API-request server may allow a third-party system 670 to access information from the social-networking system 660 by calling one or more APIs. An action logger may be used to receive communications from a web server about a user's actions on or off the social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from a client system 630 responsive to a request received from a client system 630. Authorization servers may be used to enforce one or more privacy settings of the users of the social-networking system 660. A privacy setting of a user determines how particular information associated with a user can be shared. The authorization server may allow users to opt in to or opt out of having their actions logged by the social-networking system 660 or shared with other systems (e.g., a third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
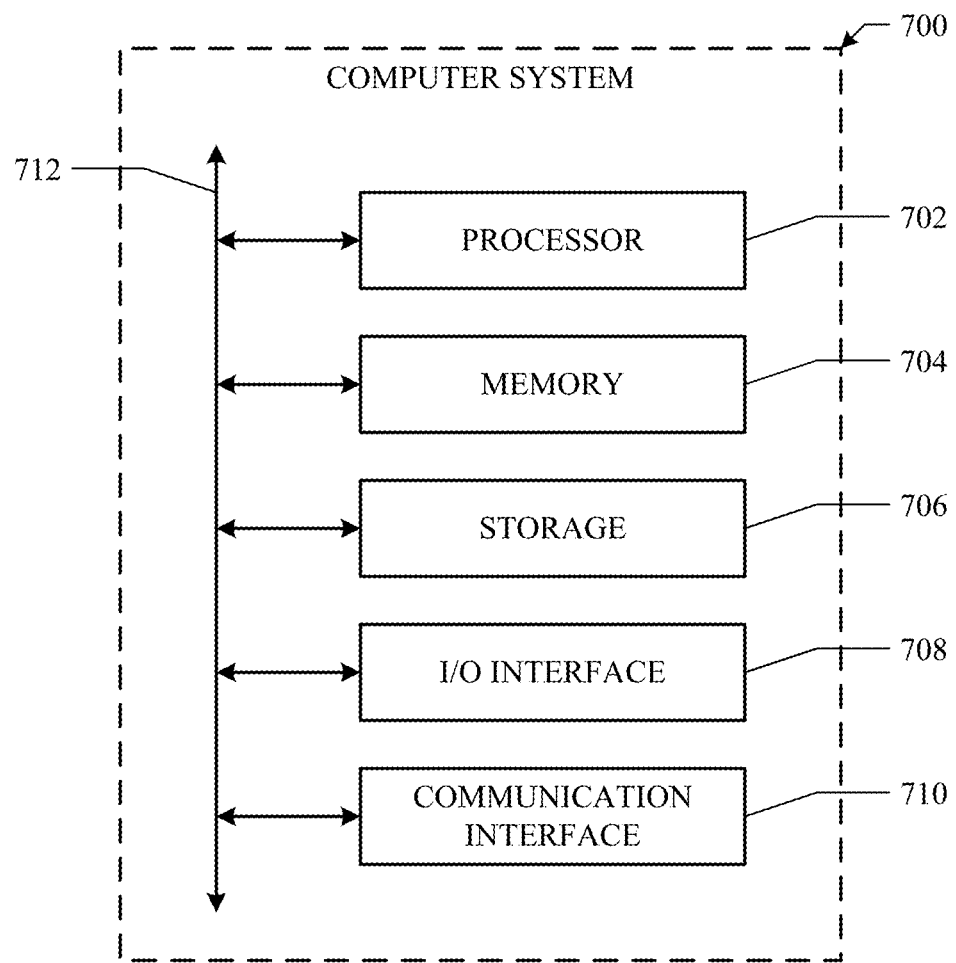
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   accessing a pair of stereo images for a scene, wherein each image of the pair of stereo images has incomplete pixel information and k channels;
   stacking the pair of stereo images to form a stacked input image with 2k channels by:
   calculating an importance score associated with each area among a plurality of areas in the scene;
   identifying an area with a highest importance score among the plurality of areas in the scene; and
   stacking the channels of both images by aligning the identified area between the pair of stereo images;
   processing the stacked input image using a machine-learning model to generate a stacked output image with 2k channels; and
   separating the stacked output image with 2k channels into a pair of reconstructed stereo images for the scene, wherein each image of the pair of reconstructed stereo images has complete pixel information and k channels.

2. The method of claim 1, wherein the pair of stereo images is used to provide a stereoscopic view of the scene to a user.

3. The method of claim 1, wherein an object captured in one of the pair of stereo images is shifted from the other image, wherein a degree of the shift is associated with a distance of the object from a viewpoint of a user.

4. The method of claim 1, wherein stacking the pair of stereo images to form the stacked input image with 2k channels comprises stacking the channels of both images by aligning pixel coordinates between the pair of stereo images.

5. The method of claim 1, wherein calculating the importance score associated with each area is based on a relative distance of the area from a vergence location of a user such that a higher importance score is assigned to a first area with a smaller distance to the vergence location of the user than a second area with a larger distance to the vergence location of the user.

6. The method of claim 1, wherein calculating the importance score associated with each area is based on content associated each area such that a higher importance score is assigned to a first area that is associated with an important content than a second area that is not associated with an important content.

7. The method of claim 1, wherein the k channels comprise RGB channels.

8. The method of claim 1, wherein the k channels comprise RGB channels and an alpha channel, wherein the alpha channel indicates a transparency level of each pixel.

9. The method of claim 1, wherein the pair of stereo images is associated with a frame in a video stream.

10. The method of claim 1, wherein the machine-learning model is an image reconstruction model that reconstructs restores sampled, noisy or damaged images.

11. The method of claim 1, wherein the machine-learning model is trained with a loss function that measures differences between each image of the pair of reconstructed stereo images and a corresponding image of a pair of ground truth stereo images.

12. One or more computer-readable non-transitory storage media embodying software that is operable when executed to:
   access a pair of stereo images for a scene, wherein each image of the pair of stereo images has incomplete pixel information and k channels;
   stack the pair of stereo images to form a stacked input image with 2k channels by:
   calculating an importance score associated with each area among a plurality of areas in the scene;
   identifying an area with a highest importance score among the plurality of areas in the scene; and
   stacking the channels of both images by aligning the identified area between the pair of stereo images;
   process the stacked input image using a machine-learning model to generate a stacked output image with 2k channels; and
   separate the stacked output image with 2k channels into a pair of reconstructed stereo images for the scene, wherein each image of the pair of reconstructed stereo images has complete pixel information and k channels.

13. The media of claim 12, wherein the pair of stereo images is used to provide a stereoscopic view of the scene to a user.

14. The media of claim 12, wherein an object captured in one of the pair of stereo images is shifted from the other image, wherein a degree of the shift is associated with a distance of the object from a viewpoint of a user.

15. The media of claim 12, wherein stacking the pair of stereo images to form the stacked input image with 2k channels comprises stacking the channels of both images by aligning pixel coordinates between the pair of stereo images.

16. The media of claim 12, wherein calculating the importance score associated with each area is based on a relative distance of the area from a vergence location of a user such that a higher importance score is assigned to a first area with a smaller distance to the vergence location of the user than a second area with a larger distance to the vergence location of the user.

17. The media of claim 12, wherein calculating the importance score associated with each area is based on content associated each area such that a higher importance score is assigned to a first area that is associated with an important content than a second area that is not associated with an important content.

18. A system comprising: one or more processors; and a non-transitory memory coupled to the processors comprising instructions executable by the processors, the processors operable when executing the instructions to:
  access a pair of stereo images for a scene, wherein each image of the pair of stereo images has incomplete pixel information and k channels;
  stack the pair of stereo images to form a stacked input image with 2k channels by:
    calculating an importance score associated with each area among a plurality of areas in the scene;
    identifying an area with a highest importance score among the plurality of areas in the scene; and
    stacking the channels of both images by aligning the identified area between the pair of stereo images;
  process the stacked input image using a machine-learning model to generate a stacked output image with 2k channels; and
  separate the stacked output image with 2k channels into a pair of reconstructed stereo images for the scene, wherein each image of the pair of reconstructed stereo images has complete pixel information and k channels.

* * * * *